March 29, 1966 C. W. BOGS ETAL 3,243,821
SEISMIC AMPLITUDE PRESENTATION
Filed Dec. 16, 1963
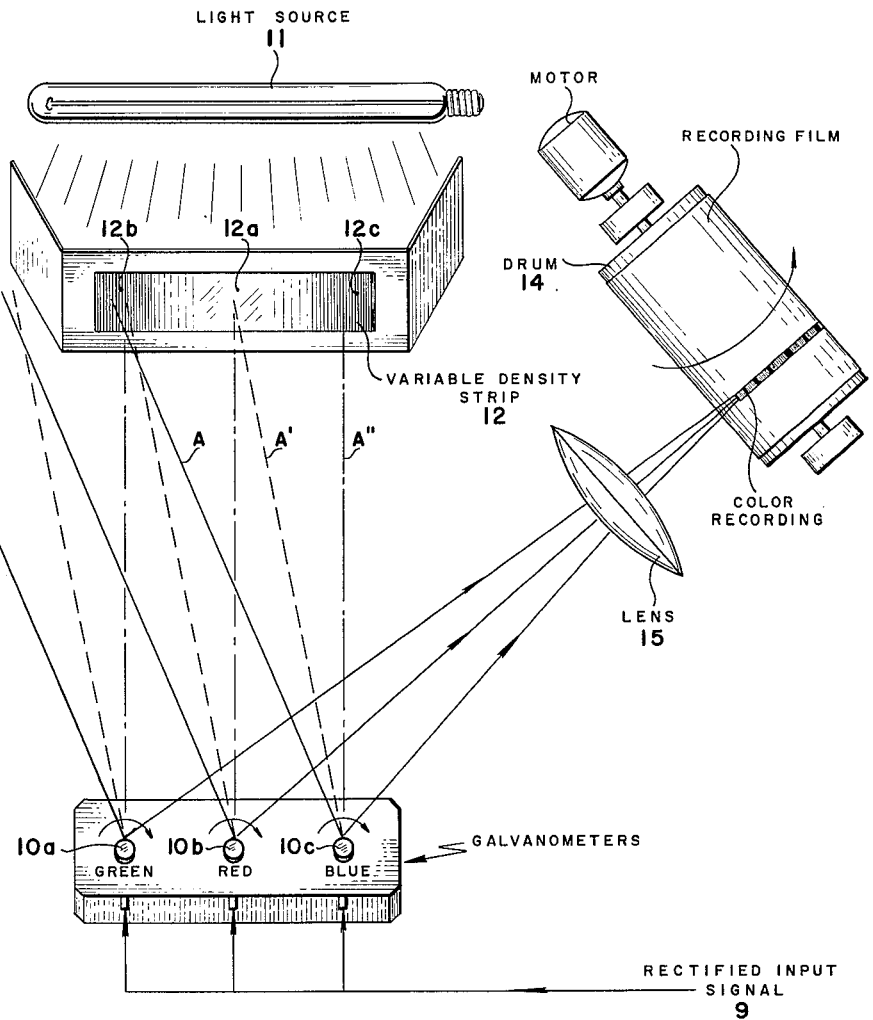
INVENTOR.
ROBERT F. GREGORY,
CHARLES W. BOGS,
BY
John S. Schneider
ATTORNEY.

United States Patent Office 3,243,821
Patented Mar. 29, 1966

3,243,821
SEISMIC AMPLITUDE PRESENTATION
Charles W. Bogs, Houston, Tex., and Robert F. Gregory, Denver, Colo., assignors, by mesne assignments, to Esso Production Research Company, Houston, Tex., a corporation of Delaware
Filed Dec. 16, 1963, Ser. No. 331,026
6 Claims. (Cl. 346—109)

The present invention relates generally to the presentation of electrical transients. In particular, it concerns the display of seismic signal amplitudes in a color spectrum in which variations in the amplitude of individual seismic events are represented as varying and distinctive spectral colors.

As is well known in geophysical prospecting, a seismic disturbance is initiated at a particular point in or near the earth's surface to direct seismic waves downwardly through the subsurface. These waves are detected at spaced points on the earth's surface which are at selected distances from the disturbance point. The depths of subsurface reflecting strata can be determined by measuring the time intervals between initiation of the disturbance and detection of the reflected waves at the detection points. Various corrections may be made to adjust the arrival times of the reflected waves to compensate, for example, for differences in elevation of the disturbance point and the various detecting points and to compensate for the low velocity layer of the earth at the several detecting points.

Amplitude, frequency, total energy, and other parameters of seismic signals aid observers in determining the characteristics of subsurface structures. Various techniques have been used to present the signals in forms that are easier to analyze. One such technique is to display the signals in variable density or variable color forms in which the signals are reproduced as photographic traces which vary in intensity, blends of black and white or blends of color, in proportion to variations in amplitude or frequency or some other parameter of the signals. This general technique is used in the present invention which has as a primary object to provide an improved method and apparatus for displaying seismic amplitude information in colors.

Briefly, the invention comprises a method for recording a seismic signal as a photographic trace in color in which the color of the trace is varied to indicate variations in amplitude of the seismic signal; the variations in amplitude of the seismic spectrum utilize all colors of the visual spectrum from blue to green with each color representing a particular amplitude of the seismic signal. An electrical-mechanical system for carrying out this method includes a camera which transforms variations in the amplitude of the applied signal fed to it from a geophone or preferably a playback magnetic record to distinctive colors. In the camera each of three moving coil galvanometers reproduces one of the primary colors, blue, red, and green, in varying intensities in response to changes in amplitudes of the seismic signal from zero to maximum voltage.

The above object and other objects as well as advantages of the invention will be more apparent from the following, more detailed description of the invention when taken with the drawings wherein:

The sole figure is a schematic view of the apparatus used to prepare and display the color film record of the invention.

Referring to this figure, a seismic input signal 9 from a conventional seismic amplifier is rectified and fed to a block of three reflecting mirror galvanometers, 10a, b, and c, such as are commonly used in seismic recording and in which each galvanometer mirror is deflected angularly about an axis in proportion to the applied voltage. Each of the galvanometers reflects one of the three primary additive colors, green, red, and blue, and for this purpose a color gelatin film is affixed to the windows or mirrors of each of the galvanometers; green for galvanometer 10a; red for galvanometer 10b; and blue for galvanometer 10c. A light source 11, preferably a long filament tungsten lamp, projects light to the galvanometer block on which the galvanometers are mounted through a double-tapered, variable density strip or light barrier 12, which is clear in its center 12a and tapers to black at its ends 12b and 12c. A rotatable film drum 14, which moves in a plane substantially perpendicular to the plane in which the galvanometers move, is arranged so that the galvanometers impinge their respective images on a common point on a photographic recording medium arranged on film drum 14. A focusing lens 15 is used to focus the colored light reflected from the galvanometers to the common point on drum 14. All of the galvanometers are supplied the same rectified seismic signal and more in unison in proportion to the amplitude of the signal.

As illustrated by the sweep paths of the galvanometers diagrammed in the figure by the solid, dashed, and dot-dashed lines designated A, A' and A", respectively, the galvanometers are arranged to sweep or scan strip 12 and reflect light projected on them through strip 12 to film drum 14. As indicated by the solid lines A, at zero voltage galvanometer 10c is focused at the black 12b end of strip 12; galvanometer 10b is focused off strip 12 a selected distance to the left of galvanometer 10c; and galvanometer 10a is also focused off the strip to the left of galvanometer 10b the same distance galvanometer 10b is focused from galvanometer 10c. In this position of the galvanometers, no light is reflected to drum 14 by the galvanometers. As the galvanometers turn clockwise in response to increased voltage, the focus of each of the galvanometers moves to the right so that with increased voltage, as indicated by the dashed lines A', galvanometer 10c is focused at the clear center 12a of strip 12; galvanometer 10b is focused at the black 12b end of strip 12; and galvanometer 10a is focused off the strip to the left of the focus of galvanometer 10b. In this position blue light only and of its greatest intensity is reflected to film drum 14. As the voltage is further increased, the focus of each galvanometer moves more to the right and as indicated by the dot-dash lines A", galvanometer 10c is focused at the black 12c end of strip 12; galvanometer 10b is focused at the clear center 12a of strip 12; and galvanometer 10a is focused at the black 12b end of strip 12. In this position only red light and of its greatest intensity is transmitted to drum 14. With increased voltage the focus of each galvanometer moves to the right until each of the galvanometers has traversed or swept strip 12; that is, at maximum voltage both galvanometers 10b and 10c would be focused off strip 12 on the right and galvanometer 10a would be focused on the black 12c end of strip 12.

In the traverse of the strip, then, each galvanometer reflects one of the primary colors from a minimum light intensity to a maximum light intensity to a minimum light intensity and a color is produced at the film on drum 14 that is a product of their relative light intensities. In this manner a seismic section which uses all colors of the visual spectra is produced.

Although not shown, the optical camera section is enclosed in a light-proof case to prevent interference from outside light sources.

Recording drum 14 is driven by its motor at the same speed as the magnetic record on the playback drum when a record is being reproduced.

The recording method has been described as a single, photographic trace recording; however, this method is readily adapted to multiple channel recording by providing suitable shielding for each separate channel. United States Patent No. 3,011,856, entitled "Automatic Plotter" issued December 5, 1961, to C. C. Palmer and R. R. Bristow, shows and describes apparatus for channeling separate traces that would be suitable for this purpose.

The completed seismic section made in accordance with this invention may be viewed over a light table which is provided with the three primary color filters (red, blue and green) positioned over light bulbs adjustable to different intensities in order to produce a certain color or combination of colors outstanding to the eye of the observer. The section may also be viewed by placing it on a flat surface and focusing three lamps, each with a different primary color filter and each adjustable to different intensities, on it to produce a reflected color or combination of colors outstanding to the observer.

If the observer desires to measure the amplitude of the recorded seismic signal he can adjust the colored light intensities to particular values which have been correlated with the colors which appear, the variations of which in turn represent particular amplitudes. The light intensities may be read off directly or they may be marked on an overlay.

Having fully described the nature, objects, apparatus and method of the invention, we claim:

1. A system for photographically recording seismic wave energy comprising:
   a light sensitive recording medium movable in one direction;
   a light source;
   at least two colored, reflecting means, each pivotal on an axis extending in a direction parallel to said one direction in unison in response to variations in amplitude of electrical signals generated in response to said seismic wave energy and adapted to reflect colored light to said recording medium;
   a double-tapered, variable density means positioned between said light source and said reflecting means adapted to transmit minimum light at its ends and maximum light at its center;
   each of said reflecting means being arranged to scan said variable density means from end to end to reflect variations in intensity from minimum to maximum to minimum of a different primary color; and
   said reflecting means being arranged such that as the color reflected from one reflecting means increases in intensity from a minimum to a maximum, no color is reflected from another of said reflecting means and as the color from said one reflecting means decreases in intensity from a maximum to a minimum, the color from said other reflecting means increases in intensity from a minimum to a maximum and as the color from said other reflecting means decreases in intensity from a maximum to a minimum, no color is reflected from said one reflecting means.

2. A system as recited in claim 1 in which said primary colors are affixed to said reflecting means.

3. A system for photographically recording seismic wave energy comprising:
   a light sensitive recording medium movable in one direction;
   a light source;
   first, second, and third reflecting means each pivotal on an axis extending in a direction parallel to said one direction in unison in response to variations in amplitude of electrical signals generated in response to said seismic wave energy and adapted to reflect the primary colors, blue, red, or green, to said recording medium;
   a double-tapered, variable density means positioned between said light source and said three reflecting means, adapted to transmit minimum light at its ends and maximum light at its center;
   each of said reflecting means being arranged to scan said variable density means from end to end to reflect variations in intensity from minimum to maximum to minimum of the primary color it reflects to said recording medium; and
   said reflecting means being separated such that as the color reflected from said first reflecting means increases in intensity from a minimum to a maximum, no color is reflected from said second and third reflecting means and as the color from said first reflecting means decreases in intensity from a maximum to a minimum, the color from said second reflecting means increases in intensity from a minimum to a maximum, and no color is reflected from said third reflecting means and as the color reflected from said second reflecting means decreases in intensity from a maximum to a minimum, the color reflected from said third reflecting means increases from a minimum to a maximum and no color is reflected from said first reflecting means and as the color reflected from said third reflecting means decreases from a maximum to a minimum, no color is reflected from said first and second reflecting means.

4. A system as recited in claim 3 in which said first reflecting means is provided with means to reflect blue color, said second reflecting means is provided with means to reflect red color, and said third reflecting means is provided with means to reflect green color.

5. In a method for recording seismic signals as photographic traces utilizing a light sensitive recording medium movable in one direction; a light source; first, second, and third reflecting means, each pivotal on an axis extending in a direction parallel to said one direction in unison in response to variations in amplitude of said seismic wave energy from zero to maximum and each adapted to reflect a different primary color to said recording medium; and a double-tapered, variable density means positioned between said light source and said three reflecting means adapted to transmit minimum light at its ends and maximum light at its center, the improvement comprising the steps of:
   transmitting light from said light source to said variable density means; and
   reflecting to said recording medium variations in intensity from minimum to maximum to minimum of the primary color reflected by each reflecting means in a manner such that when the color reflected from said first reflecting means increases in intensity from a minimum to a maximum no color is reflected from said second and third reflecting means and when the color reflected from said first reflecting means decreases in intensity from a maximum to a minimum the color reflected from said second reflecting means increases in intensity from a minimum to a maximum and no color is reflected from said third reflecting means; and
   when the color reflected from said second reflecting means decreases in intensity from a maximum to a minimum the color reflected from said third reflecting means increases from a minimum to a maximum and no color is reflected from said first reflecting means; and when the color reflected from said third reflecting means decreases from a maximum to a minimum no color is reflected from said first and second reflecting means whereby each color represents a different portion of the amplitude range of the seismic spectrum recorded.

6. A method as recited in claim 5 including the steps of:

placing a section of said recorded signals in a position for analysis thereof; and then transmitting from said section to a viewer selected colored light of at least one, but not all, of said selected colors to emphasize to said viewer amplitude ranges represented by at least one of the colors of said section.

References Cited by the Examiner

UNITED STATES PATENTS 2,944,620 7/1960 Van Dijck _____ 181—.5
2,991,446 7/1961 Loper _____ 340—15.5

LEO SMILOW, *Primary Examiner.*

J. W. HARTARY, *Assistant Examiner.*